(12) United States Patent
Curtis et al.

(10) Patent No.: US 9,124,952 B2
(45) Date of Patent: Sep. 1, 2015

(54) VIRTUALIZATION BASED CONDITIONAL ACCESS TUNER MODULE FOR PROVIDING SECURE LINEAR AND NON-LINEAR CONTENT SERVICES

(75) Inventors: William A. Curtis, Austin, TX (US); Shree A. Dandekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1423 days.

(21) Appl. No.: 12/423,164

(22) Filed: Apr. 14, 2009

(65) Prior Publication Data
US 2010/0263059 A1 Oct. 14, 2010

(51) Int. Cl.
| | | |
|---|---|---|
| *G06F 17/50* | (2006.01) |
| *H04N 21/81* | (2011.01) |
| *H04N 21/436* | (2011.01) |
| *H04N 21/443* | (2011.01) |
| *H04N 21/4623* | (2011.01) |
| *H04N 21/4627* | (2011.01) |

(52) U.S. Cl.
CPC ...... *H04N 21/8193* (2013.01); *H04N 21/43607* (2013.01); *H04N 21/4437* (2013.01); *H04N 21/4623* (2013.01); *H04N 21/4627* (2013.01)

(58) Field of Classification Search
USPC ............... 726/29; 705/16, 21, 59, 71; 380/44, 380/262, 278, 279
See application file for complete search history.

(56) References Cited

U.S. PATENT DOCUMENTS

| | | | |
|---|---|---|---|
| 2005/0172315 A1 | 8/2005 | Chen | |
| 2006/0277573 A1 | 12/2006 | Kinemura | |
| 2007/0174287 A1 | 7/2007 | McEnroe et al. | |
| 2007/0198656 A1* | 8/2007 | Mazzaferri et al. | 709/218 |
| 2008/0052663 A1* | 2/2008 | Cope et al. | 717/101 |
| 2008/0235140 A1* | 9/2008 | Read | 705/59 |
| 2008/0244660 A1 | 10/2008 | Wodka et al. | |
| 2009/0063694 A1* | 3/2009 | Foo et al. | 709/231 |
| 2009/0319782 A1* | 12/2009 | Lee | 713/156 |

* cited by examiner

*Primary Examiner* — Dante Ravetti
(74) *Attorney, Agent, or Firm* — Terrile, Cannatti, Chambers & Holland, LLP; Stephen A. Terrile

(57) ABSTRACT

A virtualized, general-purpose computer or consumer electronics (CE) device is provided with and hosts a plug-in module for securely accessing various content services. These modules are referred to as content personalization portable on demand storage units (content personalization PODs).

12 Claims, 7 Drawing Sheets

VIRTUALIZATION BASED CONDITIONAL ACCESS TUNER MODULE FOR PROVIDING SECURE LINEAR AND NON-LINEAR CONTENT SERVICES

BACKGROUND OF THE INVENTION

1. Field of the Invention

The present invention relates to information handling systems and more particularly to a virtualization based conditional access tuner module to provide secure linear and non-linear content services.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a set top box. A set-top box enables linear content acquisition from different content providers like DISH, DirecTV, and Time Warner etc. to the living room. A set-top box is a device that enables a television set to become a user interface to the Internet and enables a television set to receive and decode digital television broadcasts. A typical set top box, personal video recorder (STB/PVR) system includes a digital signal processor (DSP) which performs MPEG encoder/decoder, and voice/AC3/MPEG audio processing (such as e.g., the DMS644x available from Texas Instruments). The set top box also includes RF Demodulation, a media control unit (MCU) which controls system electronic, network, and user interface, memory which stores executing code and data and parameters, a video interface which selects a video source to be decoded or encoded. In many set top boxes, both the video front end and output stages include high-performance operational amplifiers to amplify the video signal. The set top box also includes an audio Interface which allows audio to be digitized by an audio codec and processed by DSP to provide high-quality audio. The set top box also includes a user interface which allows a user to communicate with system network, control video/audio I/O sources, and perform voice/data communication. The set top box can also include broadband and/or Wireless Connectivity to allow allows interactive television, gaming, streaming audio and video, voice over IP (VoIP). The set top box also includes power conversion circuitry which converts the input power from the AC adaptor to provide power to the various functional blocks.

Many content provider use the set-top box hardware as a root of trust to authenticate and unlock the content services in which a customer is enrolled. Additionally, in many set top boxes digital rights management is built-in to the set-top box. Additionally, with many set top boxes, the set top box SW stack initial development can be time consuming and prone to errors since most set top box software developers use computer systems for development and then port the software to less powerful integrated circuits within a set top box. Additionally, a set top box provides less flexibility in design as it is often difficult to untie the services and the tuner from the set top box.

It is also known to provide a computer system with television functionality. For example, a customer can install a television Tuner (either as an internal PCI based television tuner or as an external USB based television tuner) and start receiving TV feeds for the supported tuner functionality. With the recent launch of open cable unidirectional receiver (OCUR) enabled tuners, computer systems can be used as a high definition digital video recorder. However, there are certain limitations of using TV tuners on a computer system. For example, the tuners often require drivers and software to be installed on the computer system. Additionally, certain tuners may not work on all versions of an operating system. Known OCUR enabled tuners often require a VISTA home or VISTA Premium version of the VISTA operating system.

Additionally, provisioning of Cable Cards with an OCUR enabled tuner can be complex. The provisioning can require keys from both the tuner and the host device (i.e., the computer system or the television) since encrypted channels can only be decoded by a registered Cable Card host combination. This requirement means that a Cable Card cannot be moved between televisions without a technician visit.

Accordingly, it would be desirable to enable a conditional access tuner module for a virtualization based consumer electronics devices. It would also be desirable to provide a self-contained, secure entertainment service provider module. It would also be desirable to provide an ability to link service authentication to the tuner. It would also be desirable to provide support for a use case where a customer can easily view premium content at an alternate viewing location without having to physically move the set top box or computer system to the alternate viewing location.

SUMMARY OF THE INVENTION

In accordance with the present invention, a virtualized, general-purpose computer or consumer electronics (CE) device is provided with and hosts a plug-in module for securely accessing various content services. These modules are referred to as content personalization portable on demand storage units (content personalization PODs).

The content personalization POD encapsulates hardware and software components into a single package. The content personalization POD is designed to operate with specific content services such as digital cable services, or satellite television services, internet protocol television (IPTV) services, Internet entertainment providers, or Internet software services. The hardware subsystem includes all the components and firmware necessary to securely access and control the services. The software subsystem includes a virtual machine (VM) that resides in the POD and executes on the host computer or CE device. The content personalization POD is installed on the host via plug-and-play physical interfaces such as USB to simplify the initial installation. A hypervisor in the host provides a virtual machine environment for the POD with all the necessary interfaces for rendering audio and video output, communicating with the user, connecting with the Internet, and communicating with other devices.

In one embodiment, a satellite TV provider encapsulates a complete tuner subsystem together with a proprietary satellite TV software stack into a content personalization POD. The software, essentially the same stack that executes on an existing set-top box, executes within the host VM. Similarly, a content personalization POD can provide a content access function and might include a premium digital cable television tuner with a Cable CARD slot. In another embodiment, the hardware of the content personalization POD can include a security mechanism designed to access various types of content or applications from the Internet. Using this dedicated hardware, very high levels of security could be achieved while the virtualized host provides the necessary external resources and computing resource.

More specifically, in one embodiment, the invention relates to a method for delivering pre-packaged solutions to a consumer electronics type information handling system for facilitating secure access to content services. The method includes providing a virtual machine (VM) host comprising a plurality of VM resources operable to execute virtual machines; providing a content personalization virtual appliance device, the content personalization virtual appliance device comprising a virtual appliance, the virtual appliance comprising a content personalization application, the content personalization virtual appliance device being located upstream of the VM host relative to the content services, the content personalization virtual appliance device providing a conditional access gateway to the content services; installing the virtual appliance onto the virtual machine host via the content personalization virtual appliance device; and, facilitating secure access to the content services via the content personalization virtual appliance device.

In another embodiment, the invention relates to a system for delivering pre-packaged solutions to a consumer electronics type information handling system for facilitating secure access to content services. The system includes a virtual machine (VM) host comprising a plurality of VM resources operable to execute virtual machines; a content personalization virtual appliance device, the content personalization virtual appliance device comprising a virtual appliance, the virtual appliance comprising a content personalization application, the content personalization virtual appliance device being located upstream of the VM host relative to the content services, the content personalization virtual appliance device providing a conditional access gateway to the content services; means for installing the virtual appliance onto the virtual machine host via the content personalization virtual appliance device; and, means for facilitating secure access to the content services via the content personalization virtual appliance device.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
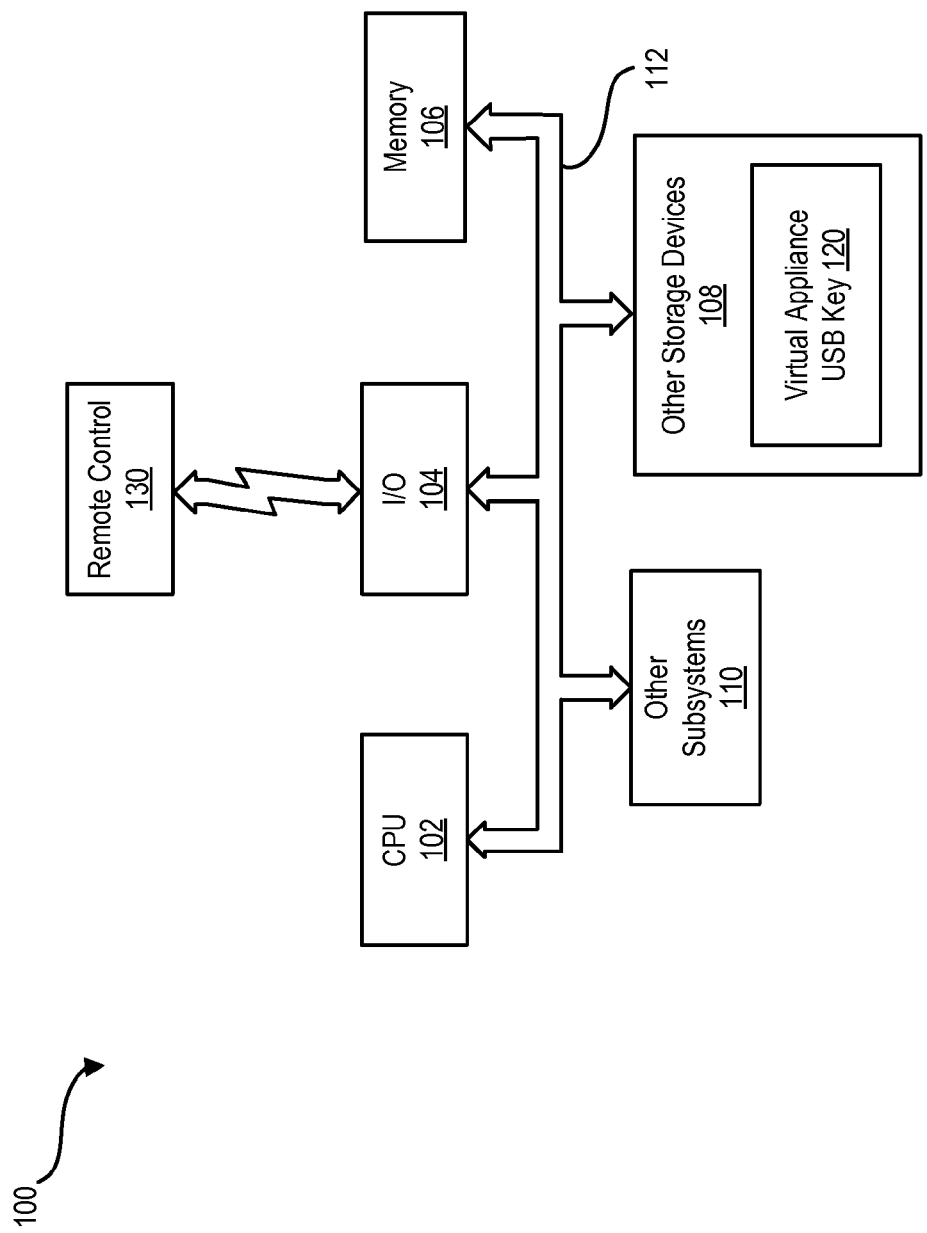
FIG. 1 shows a system block diagram of an information handling system.

Referring briefly to FIG. 1, a system block diagram of a consumer electronics type information handling system 100 is shown. The information handling system 100 includes a processor 102, input/output (I/O) devices 104, such as a display, a keyboard, a mouse, and associated controllers (each of which may be coupled to remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. One example of another storage device 108 is a virtual appliance memory device such as a virtual appliance USB key 120.

The virtual appliance memory device 120 can include one or a plurality of virtual appliances. Each virtual appliance is a self-contained virtual machine that implements a solution such as a consumer solution (including an operating system (OS), and application and a default configuration). Examples of self-contained virtual machines can include a productivity module and browser, a media server/content delivery module, a home finance/online banking module, a gaming module, a personal networking module, a home automation and security module, and a home design and maintenance module. Because the virtual machines are self-contained and isolated using virtualization technology, each solution can be preconfigured and ready to use, without a customer having to install and configure the solution. Additionally, the virtual machines provide a stable platform that has no variability when moved from one user or system to another user or system.

Figure 2:
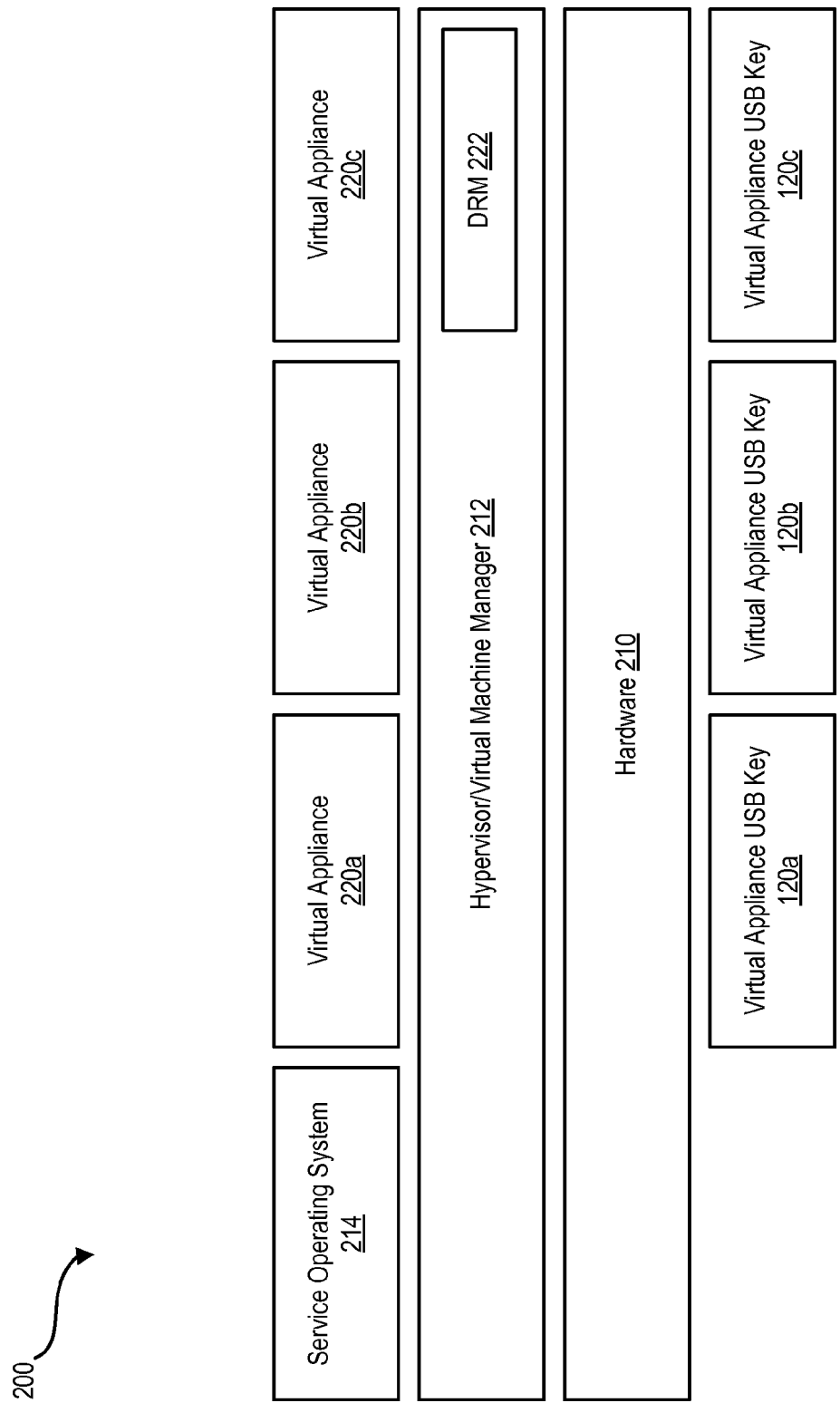
FIG. 2 shows a system block diagram of a consumer electronics type information handling system infrastructure architecture.

Each of the virtual appliances is installed on the information handling system 100 via a respective virtual appliance USB key 120 (e.g., a personalization pod). Using a virtual appliance USB key 120 not only simplifies an initial installation, but also subsequent need to move the virtual machine if the capacity of the information handling system is exceeded. FIG. 2 shows the architecture diagram of the consumer electronics type information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 2, a system block diagram of an information handling system infrastructure architecture 200 is shown. More specifically, information handling system hardware 210 executes a virtual machine manager application 212 (which may be e.g., a hypervisor). The information handling system infrastructure architecture 200 also includes a service operation system 214 that is executed by the hardware 210.

One or more virtual appliance devices 120a, 120b, 120c may be coupled to the hardware 210. Each of the devices 120 allow a self contained virtual appliance 220 to be installed on the information handling system hardware 210. In certain embodiments, a digital certificate of authenticity (COA) is included with each virtual appliance 220. The COA is checked by the virtual hardware 210 before the appliance is installed onto the system 200.

The virtual machine manager application 212 includes a digital rights management (DRM) module 222. The DRM module 222 enables digital rights management of each virtual machine, such as a content personalization type virtual machine. With the DRM module 222, content accessed via each virtual appliance 220 within the information handling system 100 is managed so that the digital rights of the content are assured.

A data structure with computing resource requirements is included with each virtual appliance. These include CPU requirements, memory requirements, storage requirements, and network bandwidth requirements. In certain embodiments, the data structure also includes a prioritization associated with each resource requirement.

Before a virtual appliance is installed, the virtual machine manager 212 ensures that it has enough capacity to host the appliance. The virtual machine manager 212 also contains a resource meter (which may be located on a panel of the information handling system) to represent current resource capacity and remaining resource capacity to simplify capacity planning. The virtual machine manager 212 can also maintain a database of all virtual machines that have been coupled to the device. In this way if a virtual machine is removed and then reinserted, the certification process can be expedited. Additionally, in certain embodiments, the system may have a more limited set of virtual machines to which the system is authorized. In this case, the virtual machine manager 212 can maintain information regarding the more limited set of virtual machines.

Figure 3:
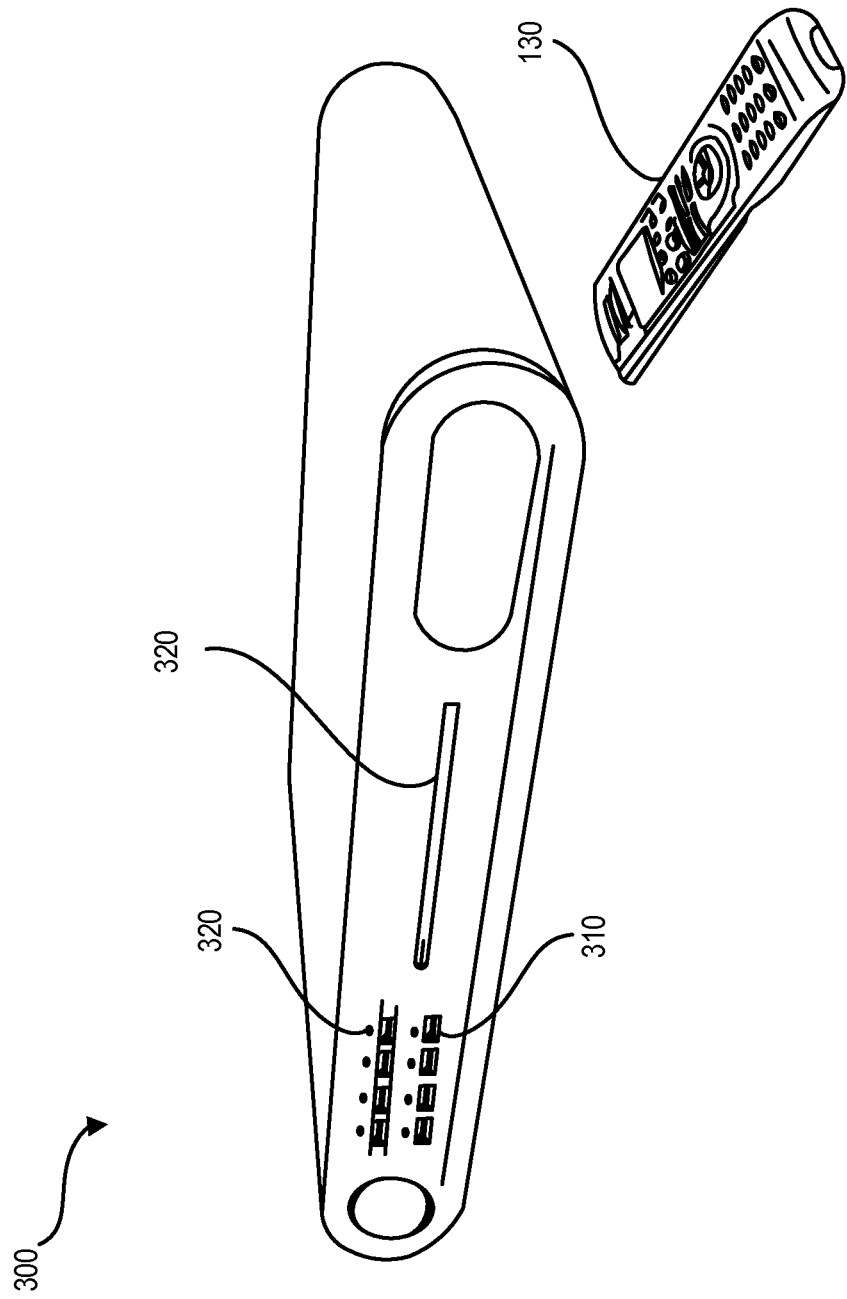
FIG. 3 shows a conceptual perspective view of a panel of a consumer electronics type information handling system.

Referring to FIG. 3, a conceptual perspective view of a consumer electronics type information handling system is shown. More specifically, the consumer electronics type information handling system 300 includes a plurality of USB connections 310 (some of which may be located towards the rear of the system 300 to facilitate connection of a content personalization type virtual machine to which various types of content provides may be coupled). Each USB connection includes a corresponding connection indication 320. The USB connection indication 320 can include an indicia (e.g., a color indication) of whether a virtual appliance is installed and executing on the consumer electronics type information handling system 100. The consumer electronics type information handling system 300 also includes a slot 330 into which additional media (such as e.g., a DVD or CD-ROM) may be inserted. The consumer electronics type information handling system 300 also includes a provision for communicating (e.g., an infrared receiver located on the front panel of the system with the remote control device 130 or other types of I/O devices.

Figure 4:
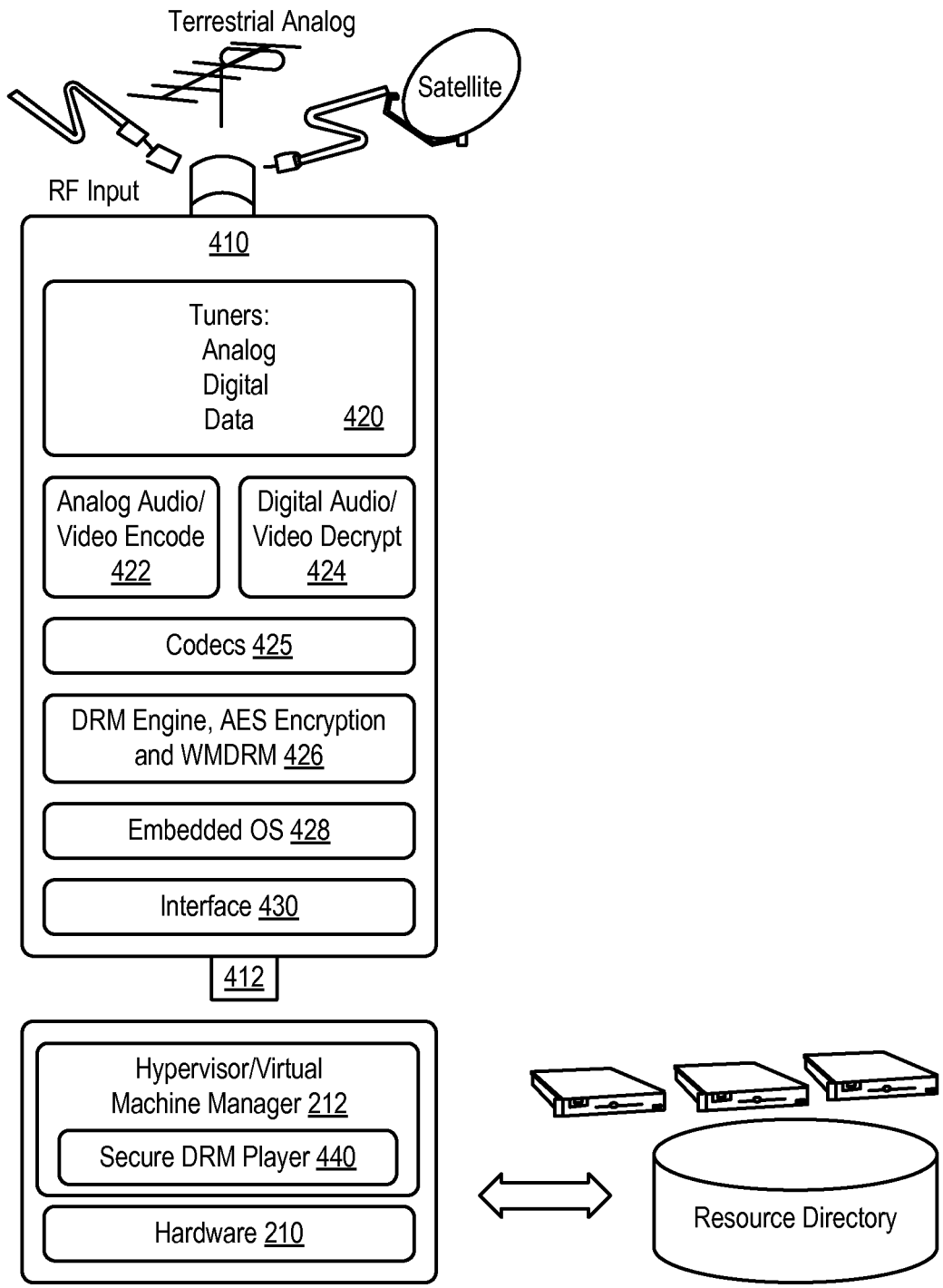
FIG. 4 shows a block diagram of a host system and a content personalization virtual appliance.

Referring to FIG. 4, a block diagram of a host system and a content personalization virtual appliance is shown. More specifically, the content personalization appliance 410 may be coupled to a host system, such as the information handing system 100, via a connector 412 such as a USB type connector. The content personalization virtual appliance includes a tuner 420, an analog video encode module 422, a digital video decryption module 424, a codec module 426, a digital rights management engine 426, an embedded operating system 428 and an interface module 430.

The tuner 420 can include an analog television tuned, a digital television tuner as well as a data tuner. The codec module 425 can include one or more codecs for encoding and decoding a digital data stream. The codec may include a combination of a compressor decompressor codec, a coder decoder code and a compression decompression codec. The DRM engine 426 can perform an advanced encryption standard (AES) type encryption operation as well as a Windows Media digital rights management (WMDRM) type operation. The embedded operating system 428 can include a Linux type operating system.

The host system to which the content personalization virtual appliance is coupled includes the hypervisor/virtual machine manager 212 as well as the underlying information handling system hardware 210. The hypervisor 212 includes a secure DRM player module 440.

The tuner 420 also has integrated support for provider-specific CODECs. For example, a particular provider such as a satellite television provider might include CODECs for decoding the provider's specific signals.

In operation, digital video is decrypted within the tuner using extremely secure service-provider mechanisms. Provisioning of the service occurs when a customer inserts the content personalization virtual appliance into the host system. A root of trust is embedded in the tuner module 420, so the pairing process is automatic from the standpoint of the user. Before any content crosses into the host environment, the content is re-encrypted into a digital-home friendly DRM scheme for use within the host system and possibly over a home network to which the host system is coupled.

The software stack is a complete application executing with an embedded operating system. For example Linux can be the embedded operating system for the virtual machine and the application stack substantially conforms to the application stack that executes on known set-top boxes, complete with channel selection, program guide, DVR scheduling, and on-demand content such as pay-per-view movies. In addition, the virtual appliance based software stack can execute on many types of hosts including those with powerful, multi-core processors with massive memory and disk resources, extremely fast network connections, and unlimited connections to peripheral devices.

Figure 5:
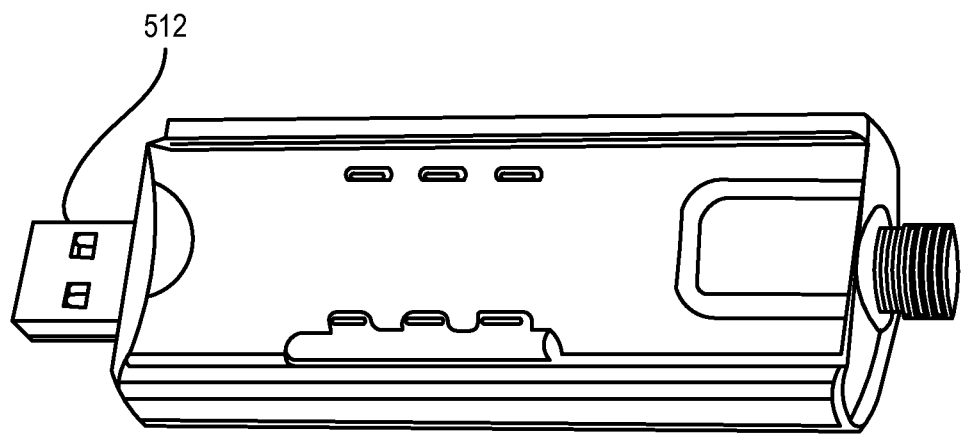
FIG. 5 shows a conceptual perspective view of a content personalization virtual appliance.

FIG. 5 shows a conceptual perspective view of a content personalization virtual appliance 410. The content personalization virtual appliance 410 has the appearance and approximate form factor of a USB type memory device. In one embodiment, the content personalization virtual appliance 410 includes a USB type connector 412 at one end and a content input connector 510 at the other end.

The content input connector 510 comprises a RF type connector. The content input is configured to receive any of a plurality of signal types including terrestrial analog type content signals, digital cable type content signals and satellite type content signals.

Figure 6:
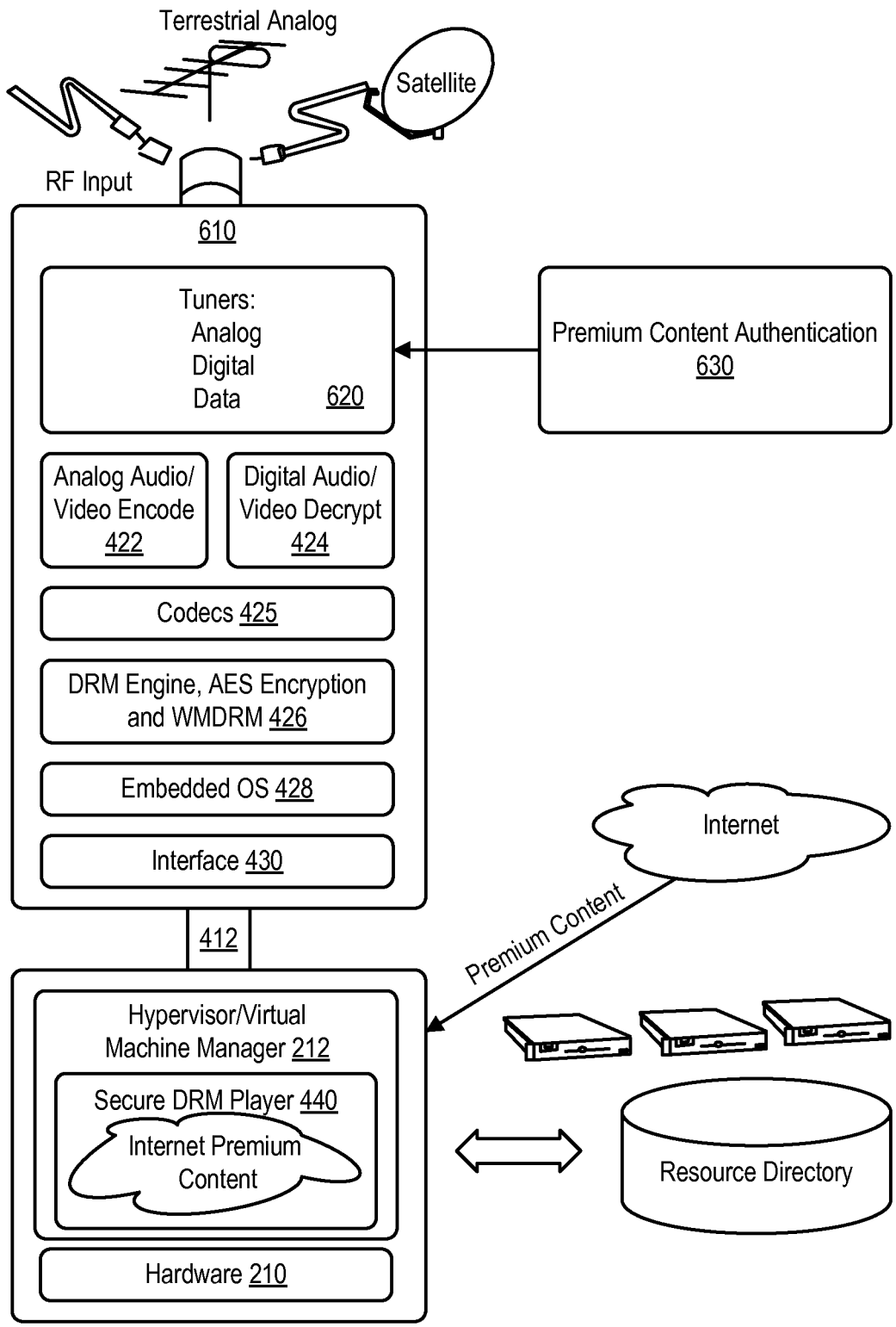
FIG. 6 shows a block diagram of a host system and a content personalization virtual appliance.

FIG. 6 shows a block diagram of a host system and another content personalization virtual appliance 610. More specifically, the content personalization appliance 610 may be coupled to a host system, such as the information handing system 100, via a connector 412 such as a USB type connector. The content personalization virtual appliance includes a tuner 620, an analog video encode module 422, a digital video decryption module 424, a codec module 426, a digital rights management engine 426, an embedded operating system 428 and an interface module 430.

With the content personalization virtual appliance 610, the tuner 620 is coupled to a premium content authentication module 630. In certain embodiments, the premium content authentication module 630 can include a Cable Card type authentication module.

The content personalization virtual appliance 610 can provide an authentication function for enabling premium content from a content provider such as a cable or Internet provider The virtual appliance 610 includes a USB interface 412 and includes a DRM engine 426 to authenticate streams from the host. The content is streamed from the internet to the virtual appliance 610 via this host connection. The virtual appliance 610 has the root of trust and facilitates the decryption of content such as digital video, music, software applications, or disk files. If the virtual appliance 610 is removed from the host, the host cannot access any of this secure content.

Figure 7:
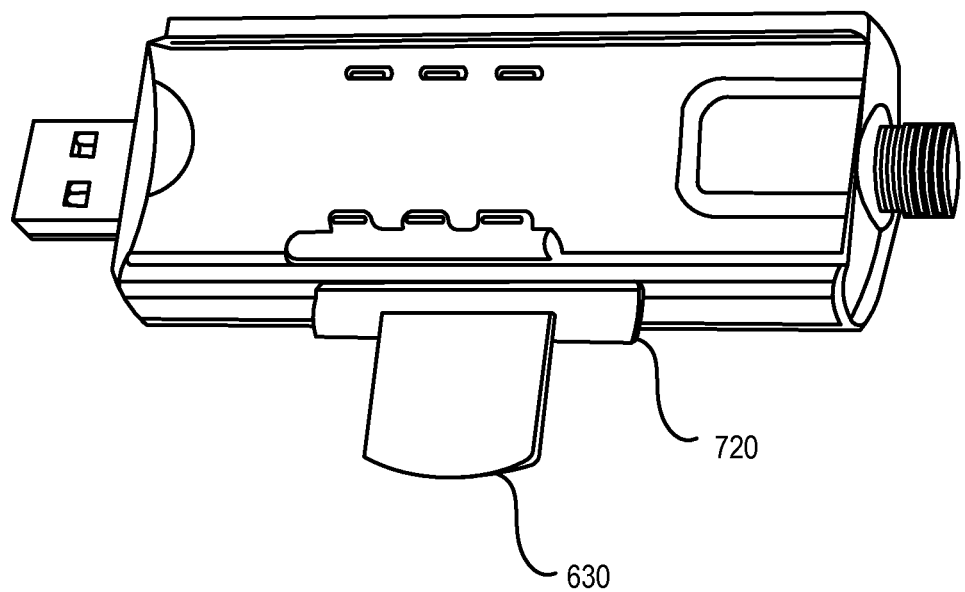
FIG. 7 shows a conceptual perspective view of another content personalization virtual appliance.

FIG. 7 shows a conceptual perspective view of another content personalization virtual appliance 610. More specifically, the content personalization virtual appliance 610 includes a connection portion 620 via which a premium content authentication module 630 can be coupled to the virtual appliance 610.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the virtual appliance memory device 120 may function as a license and resource management token and not necessarily as a storage device for the virtual appliance.

Also for example, the virtual machine manager may include a unique user interface that executes on the hypervisor and display the current services that the customer can access. The user interface can also include notifications and messages to the user for different events and exceptions in a user friendly format.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for delivering pre-packaged solutions to a consumer electronics type information handling system for facilitating secure access to content services comprising:
    providing a virtual machine (VM) host comprising a plurality of VM resources, wherein the plurality of VM resources comprising virtual machines;
    executing, by the VM host, the provided virtual machines from the plurality of VM resources;
    providing a content personalization virtual appliance device, wherein the content personalization virtual appliance device comprising a virtual appliance, wherein the virtual appliance comprising a content personalization application;
    positioning the content personalization virtual appliance device upstream of the VM host relative to the content services;
    providing, by the content personalization virtual appliance device, a conditional access gateway to the content services;
    installing, by the content personalization virtual appliance device, the virtual appliance onto the virtual machine host;
    providing, by the content personalization virtual appliance device, secure access to the content services;
    performing, by the content personalization virtual appliance device, an automatic provisioning process, wherein the automatic provisioning process performs the operation of pairing, by the content personalization virtual appliance device, the virtual appliance with the virtual machine host;
    exposing the content personalization virtual appliance device to a plurality of virtual machine hosts;
    providing, by the content personalization virtual appliance device, secure access to an application, wherein the application comprises television services;
    storing, by the content personalization virtual appliance device, a service provider software stack on the content personalization virtual appliance device;
    providing, by the content personalization virtual appliance device, a television tuner that accesses the content services, wherein the content services comprise television services; and,
    providing, by the virtual appliance, support for the application that uses the secure access.

2. The method of claim 1 wherein: the content personalization virtual appliance device comprises a virtual appliance universal serial bus (USB) connector, the USB connector enabling coupling of the content personalization virtual appliance device with the virtual machine host.

3. The method of claim 1 wherein: the content personalization virtual appliance device further comprises a digital rights management engine.

4. The method of claim 1 wherein: the content personalization appliance device further comprises a root of trust, wherein the provisioning is performed portably.

5. The method of claim 1 wherein:
executing, by the VM host processor, a service provider software stack within a virtual machine on the virtual machine host;
updating, by the content personalization appliance device, the stored service provider software stack by a service provider.

6. The method of claim 1 wherein:
the content services further comprises at least one of satellite services, cable television services and Internet services; and,
the virtual appliance provides support for an application that uses the secure access, the application comprising at least one of a music application, a voice over internet protocol (VoIP) application, a real time communication application, a conferencing application, a software application and a storage application.

7. A system for delivering pre-packaged solutions to a consumer electronics type information handling system for facilitating secure access to content services comprising:
a virtual machine (VM) host processor;
the VM host comprising a plurality of VM resources, wherein the plurality of VM resources comprising virtual machines;
instructions stored on a non-transitory medium when executed by the virtual machine (VM) host processor, causes the virtual machine (VM) host processor to perform the steps of:
providing virtual machines from the plurality of VM resources;
a content personalization virtual appliance device processor;
instructions stored on a non-transitory medium when executed by the virtual appliance device processor, causes the virtual appliance device processor to perform the steps of:
providing a conditional access gateway to the content services;
wherein the content personalization virtual appliance device comprises a virtual appliance, wherein the virtual appliance comprises a content personalization application;
installing the virtual appliance onto the virtual machine host;
wherein the content personalization virtual appliance device is positioned upstream of the VM host relative to the content services;
storing a service provider software stack on the content personalization virtual appliance device;
providing secure access to the content services;
performing an automatic provisioning process, wherein the automatic provisioning process performs the operation of pairing the virtual appliance with the virtual machine host;
exposing the content personalization virtual appliance device to a plurality of virtual machine hosts;
providing secure access to an application, wherein the application comprises television services;
providing a television tuner that accesses the content services, wherein the content services comprise television services; and,
providing support for the application that uses the provided secure access.

8. The system of claim 7 wherein:
the content personalization virtual appliance device comprises a virtual appliance universal serial bus (USB) connector, the USB connector that couples the content personalization virtual appliance device with the virtual machine host.

9. The system of claim 7 wherein: the content personalization virtual appliance device further comprises a digital rights management engine.

10. The system of claim 7 wherein:
the content personalization appliance device further comprises a root of trust, wherein the provisioning is performed portably.

11. The system of claim 7 further comprising the steps of:
executing, by the VM host processor, a service provider software stack within a virtual machine on the virtual machine host;
updating, by the content personalization appliance device, the stored service provider.

12. The system of claim 7 wherein:
the content services further comprises at least one of satellite services, cable television services and Internet services; and,
the virtual appliance provides support for an application that uses the secure access, the application comprising at least one of a music application, a voice over internet protocol (VoIP) application, a real time communication application, a conferencing application, a software application and a storage application.

* * * * *